May 31, 1960 G. I. HOLMES 2,938,539
COMBINED ELECTRORESPONSIVE VALVE AND PRESSURE REGULATOR
Original Filed April 5, 1951
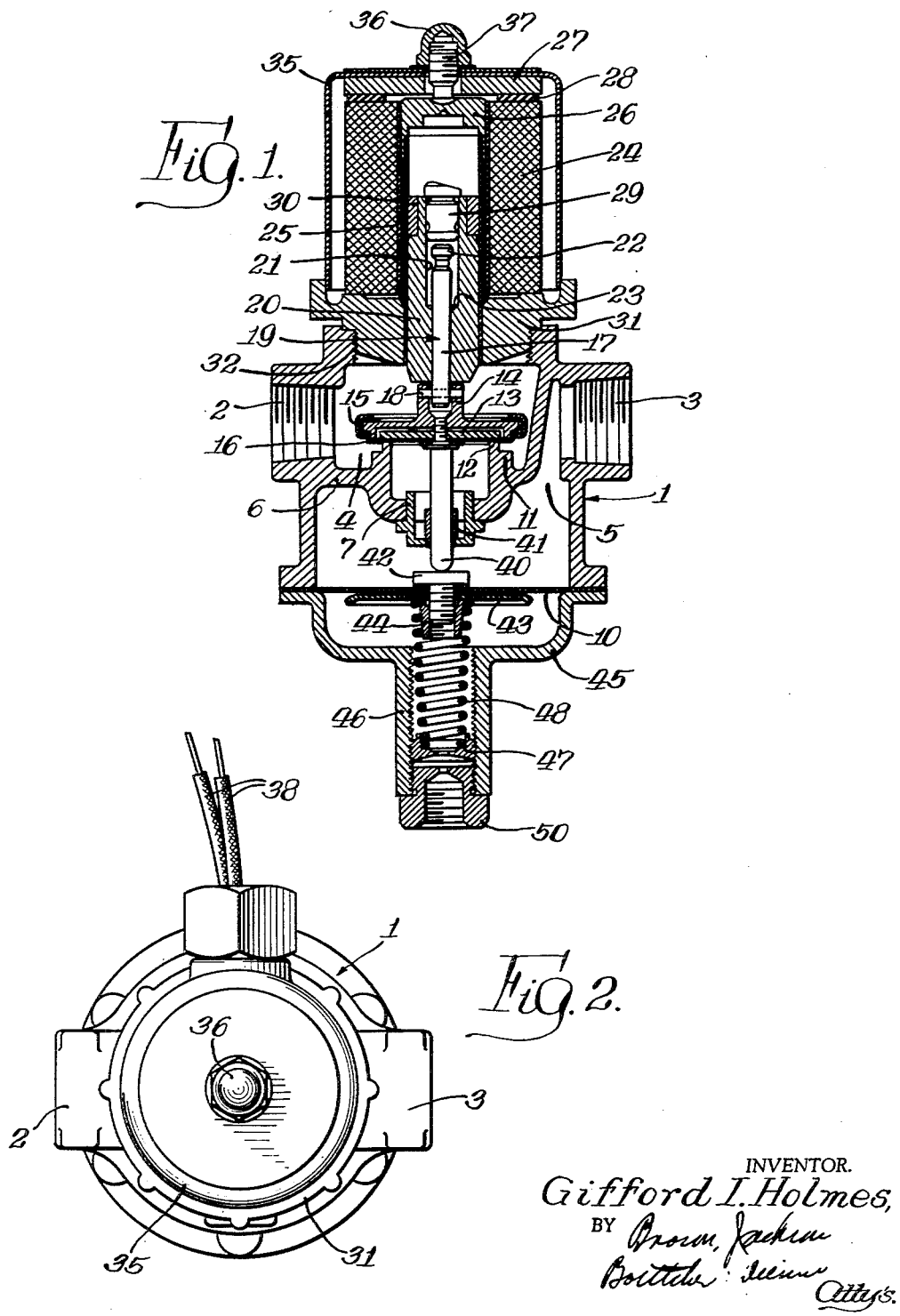
INVENTOR.
Gifford I. Holmes,
BY
Attys.

United States Patent Office 2,938,539
Patented May 31, 1960

2,938,539

COMBINED ELECTRORESPONSIVE VALVE AND PRESSURE REGULATOR

Gifford I. Holmes, Neponset, Ill., assignor to Baso Inc., Milwaukee, Wis., a corporation of Wisconsin Original application Apr. 5, 1951, Ser. No. 219,457, now Patent No. 2,821,206, dated Jan. 28, 1958. Divided and this application May 22, 1957, Ser. No. 660,821

1 Claim. (Cl. 137—505.42)

This application is a division of application Serial No. 219,457, filed April 5, 1951, now Patent No. 2,821,-206.

This invention relates, in general, to a control device for gas burners, and has particular relation to an improved combined electroresponsive valve and pressure regulator for the gaseous fuel.

While the invention has particular utility in automatically controlling the main burner of a furnace, water heater, or other device of this type, it is to be understood that the invention is not limited to this particular use but may be employed for all similar or equivalent purposes as suitable or desired.

One of the main objects of the present invention is to provide an improved combined electroresponsive valve and pressure regulator in which the valve means for electroresponsively controlling the supply of fuel and for regulating the pressure seats with the direction of fuel flow through the device so as not to be unseated by the gas pressure.

Another object of the invention is to provide a device which does not require a separate pressure chamber for the diaphragm, or equivalent pressure responsive device of the pressure regulator, or a tube or equivalent means, for admitting regulating pressure fluid to such a separate chamber from the discharge side of the electroresponsive valve.

Another object of the invention is to provide a device in which the diaphragm or equivalent pressure responsive device forms at least a part of one of the walls of the discharge chamber of the electroresponsive valve so as to be directly responsive to the gas pressure in such discharge chamber.

Another object of the invention is to provide a device in which there is combined with a diaphragm or equivalent pressure responsive device forming at least a part of one of the walls of the discharge chamber of the electroresponsive valve a pressure regulator stem which coacts with the pressure responsive diaphragm and with the valve means.

Another object of the invention is to provide a device in which there is a single valve member under the control of the electroresponsive means and operated by the diaphragm or equivalent pressure responsive device which forms at least a part of one of the walls of the discharge chamber of the electroresponsive valve.

Further features and advantages and numerous adaptations of the invention will be apparent from the following detailed description and the accompanying drawings.

In the drawings:

Figure 1 is a vertical axial section through a combined electroresponsive valve and pressure regulator embodying the present invention; and Figure 2 is a top plan view of the valve shown in Figure 1.

The embodiment of the invention shown in Figures 1 and 2 comprises a valve body 1 having a gaseous fuel inlet 2 and a gaseous fuel outlet 3. The direction of gas flow through the device is indicated by the arrow in Figure 1.

The inlet 2 opens into an inlet chamber 4, and the outlet 3 opens from a chamber 5 which constitutes a combined discharge or outlet chamber and pressure chamber. The chambers 4 and 5 are separated by a wall or partition 6 provided with an opening in which is mounted a tubular member 7. The cup-shaped formation 11 of partition 6 provides within the inlet chamber 4 an upstanding annular valve seat 12 with which the electroresponsive valve cooperates for regulating flow of gas and against which it is adapted to seat to shut off the flow of gas through the device. The electroresponsive valve comprises a yielding valve disc or pad 13 carried by a valve cup 14. A clamp ring is shown at 15, and a diaphragm may be provided as shown at 16.

The electroresponsive valve, or condition responsive means, is shown in the form of a solenoid valve. Its stem 17, which is preferably non-magnetic and extends at its lower end telescopically into the hub of the valve cup 14 is secured therein, for example, by a pin 18. The stem 17 is slidable in a bore 19 which extends longitudinally through the solenoid plunger or armature 20. The plunger or movable element 20 is counterbored at 21, and the stem 17 has a head 22 outwardly beyond the shoulder 23 with the parts positioned as shown.

The armature or plunger 20 is slidable to active or inactive positions, independently of valve member 13, in a guide tube 25 which is preferably formed of non-magnetic material. The pin 17, as shown, may be elongated to achieve the aforementioned independent movement of plunger 20 relative to valve member 13. The tube 25 is closed at its outer end by a plug 26 which is also preferably formed of non-magnetic material. The magnet coil 24 surrounds the upper or outer portion of the tube 25, and upon energization draws the plunger 20 outwardly toward the plug 26 to its inactive position, the plunger, in the embodiment shown, being normally biased to its active position by gravity or, if desired, it may be suitably spring loaded for that purpose. A magnetic flux washer 27 is provided above the upper end of the coil 24 preferably with a gasket 28 interposed therebetween. The upper end of the bore 19 in the plunger 20 is closed by a plug 29, and a shading ring is provided at 30.

The lower end of the tube 25 is fixed in a tube support 31 which is threaded into the valve body 1 at 32. A gasket (not shown) may be interposed between the valve body 1 and the tube support 31. The coil 24, flux washer 27 and related parts are enclosed within a solenoid hood 35 which is clamped in place by a cap nut 36 screwed on a threaded stud 37 carried by the plug 26.

Electric power for energizing the coil 24 is supplied by insulated conductors shown at 38 in Figure 2. These conductors 38 may be connected to any suitable source of electric current, for example, through a step down transformer to the line wires adjacent to where the device is installed or thermoelectric generator. The line conductors may lead, for example, from a suitable source of alternating current, such as a household or commercial current supply line of the type which averages about 115 volts.

The valve cup 14, which carries the valve disc 13, is disposed coaxially with respect to the valve seat 12 and is screwed upon the upper end of a valve stem 40. The valve stem 40 has axial reciprocatory movement in a stem guide 41 carried in an opening in the lower end wall of the member 7. At its lower end the stem 40 is rounded for cooperation with the headed upper end of a screw 42.

The diaphragm 10, at its axis, is clamped between a washer 43 and the head of the screw 42. The threaded shank of the screw 42 passes through an axial opening in the diaphragm 10 and is screwed into a nut 44. The outer periphery of the diaphragm 10 is clamped between a flange on the open lower end of the discharge chamber portion of the valve body 1, and the cooperating flange of a cover 45. The cover 45 has an integral and axially disposed tubular portion 46 into which is screwed an adjusting nut 47. Yieldable means in the form of a coiled spring 48 is interposed between the washer 43 and the adjusting means in the form of an apertured nut 47. The spring 48 is biased upwardly and is adapted as described below to unseat or open the valve 13 in the inactive position of armature 20, and the pressure adjusting action of the diaphragm and its valve are adjusted by adjusting the screw 47 in the tubular part 46. A cover nut 50 is screwed in the lower end of the tubular part 46 and closes the same.

The operation of the device is as follows

When the electric circuit through the coil 24 is closed, the plunger 20 is drawn upwardly from its active position to its inactive position and its biasing force normally closing valve 13 is removed, which permits valve 13 to move to open position under the influence of spring 48 as long as the coil 24 is energized. The spring 48, with coil 24 energized, yieldingly holds the valve 13 open, and therefore gaseous fuel enters through the inlet 2 and flows through the inlet chamber 4, tubular member 7, outlet chamber 5, and out through the outlet 3 in the direction indicated by the arrow in Figure 1, for example, to a main gaseous fuel burner.

The gaseous fuel in its flow through the outlet chamber 5 acts in said chamber directly upon the diaphragm 10. An increase in pressure will flex the diaphragm downwardly against the force of the spring 48 with accompanying movement of the valve 13 toward its seat 12. Movement of the valve 13 is thus effected with respect to the valve seat 12 by the pressure of the gaseous fuel within the outlet chamber 5 on the diaphragm 10 and in amount which varies with the pressure. The closer the valve 13 approaches its seat 12 the greater is the pressure drop through the tubular member 7. A simple and convenient gas pressure regulator is thus provided.

Upon deenergization of the coil 24, for example, by opening of a thermostat, limit switch or other condition responsive device in the circuit for this coil, the plunger 20 is released and drops by gravity to its active position, closing the valve 13 with impact or with a hammer-like blow, and holding the valve 13 closed against the biasing force of spring 48 as long as the coil 24 is deenergized.

It will be noted that the valve stem 40, which has reciprocatory movement in the guide 41 is screwed or attached at its upper end to the valve cup 14. Also, the regulating action of the diaphragm 10 on the shut-off valve 13 is adjusted by adjusting the screw shown at 47 in Figure 1.

It will be noted that in the embodiment of the invention disclosed the pressure responsive means is free of the weight of the electroresponsive means in operating the shut-off valve to open position and holding same open; also that the pressure responsive means and the electroresponsive means are located beyond opposite ends of the port means, and that the actuating stem 40 is disposed for operation within the port means and cooperates with the valve means at one end and with the pressure responsive means at the opposite end.

The embodiment of the invention shown in the drawings is for illustrative purposes only, and it is to be expressly understood that said drawings and the accompanying specification are not to be construed as a definition of the limits or scope of the invention, reference being had to the appended claim for that purpose.

I claim

In an apparatus for controlling the flow of fluid fuel, a unitary valve body having a fluid inlet opening into an inlet chamber, a fluid outlet opening from an outlet chamber, a partition separating said inlet and outlet chambers and having a cup-shaped portion and a port for flow of fluid from said inlet to said outlet, a valve seat defined by the open end of said cup-shaped portion of said partition at the inlet end of said port, a tubular member in said port, a guide member carried by said tubular member, a shut-off valve engageable with said valve seat in the direction of fluid flow from said inlet to said outlet to shut off said fluid flow, said shut-off valve being positioned above said valve seat to seat thereon by gravity, a pressure responsive stem guided solely by said guide member and connected to said shut-off valve, and pressure responsive means comprising a single spring loaded flexible diaphragm directly defining one wall of said outlet chamber, a washer positioned beneath said diaphragm, a headed screw axially passing through said diaphragm and securing said washer thereto, said diaphragm being disconnected from said pressure responsive stem but coacting therewith through said headed screw to actuate said shut-off valve by flexing of said diaphgram responsive to variations in pressure of the fluid.

References Cited in the file of this patent

UNITED STATES PATENTS

| 856,989 | Schultz | June 11, 1907 |
|---|---|---|
| 1,743,127 | Fuller | Jan. 14, 1930 |
| 2,050,430 | Erickson | Aug. 11, 1936 |
| 2,212,762 | Wittmann | Aug. 27, 1940 |
| 2,226,761 | Fox | Dec. 31, 1940 |
| 2,245,834 | Sparrow | June 17, 1941 |
| 2,509,505 | Johnson | May 30, 1950 |
| 2,666,278 | Matasovic | Jan. 19, 1954 |

FOREIGN PATENTS

| 267,867 | Italy | Sept. 24, 1929 |